Nov. 7, 1950          G. A. FISHER          2,528,745
AUTOMATIC THROTTLE CONTROL SYSTEM
Filed Jan. 7, 1948
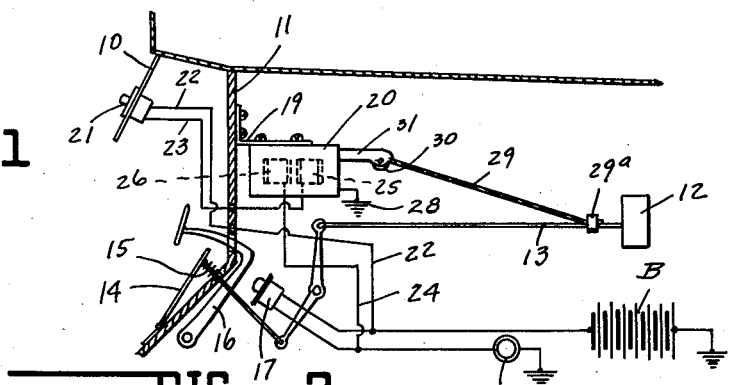
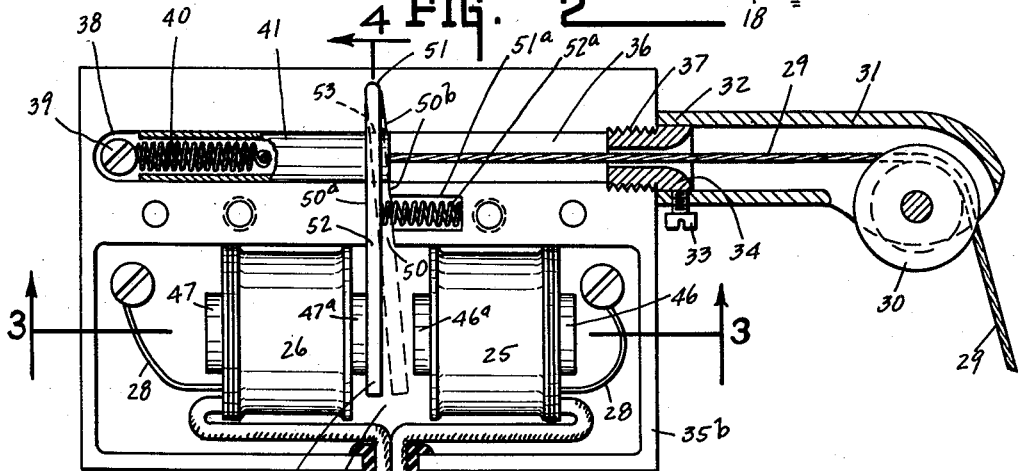
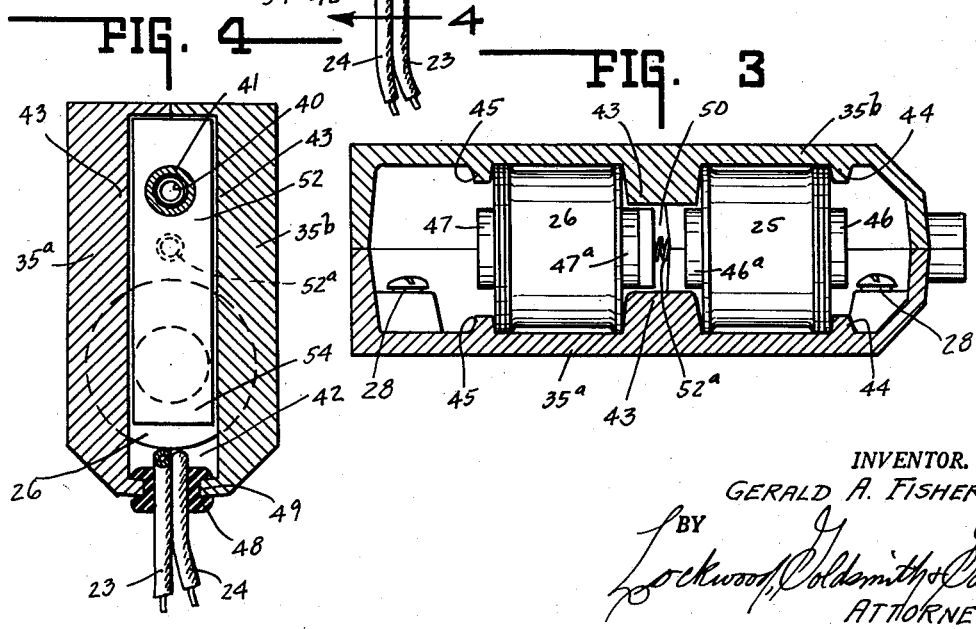
INVENTOR.
GERALD A. FISHER.
BY
Lockwood, Goldsmith & Galt,
ATTORNEYS.

Patented Nov. 7, 1950

2,528,745

UNITED STATES PATENT OFFICE 2,528,745

AUTOMATIC THROTTLE CONTROL SYSTEM

Gerald A. Fisher, Huntington, Ind., assignor to The Maco Corporation, Huntington, Ind., a corporation Application January 7, 1948, Serial No. 1,010

11 Claims. (Cl. 192—3)

This invention relates to an automatic throttle control system that is manually imposed upon a conventional carburetor or like throttle control, and which is automatically deposed therefrom upon acceleration or braking.

The present invention consists of a simple attachment that is electrically controlled and more particularly, is an improvement upon the invention disclosed in copending application Serial No. 746,977 filed May 9, 1947, now Patent No. 2,467,485, dated April 19, 1949. It is also an improvement upon the invention disclosed in copending application Serial No. 670,600, filed May 17, 1946, now Patent No. 2,509,358.

In these three disclosures there is provided a throttle control connected reciprocable member, a locking member for same, manually initiated means for setting the locking member in locking position, and a release mechanism.

Both copending applications disclose a toothed, elongated reciprocable member associated with which is a tooth member movable transversely thereof. The variability of control is limited to steps determined by tooth width.

One chief object of the present invention is to eliminate this step limitation thereby insuring substantially complete adjustment or variability of control within the operating limits of an elongated reciprocable member.

Another chief object of the present invention is to have the locking member directly subject to control action instead of being indirectly subject thereto as disclosed in both copending applications.

One feature of the present invention resides in having the locking member disposed approximately transverse to the elongated control member as before, but with this difference, the locking member is disposed between confronting poles of aligned coils, the alignment being substantially parallel to the longitudinal axis of the elongated member.

Other objects and features will be set forth more fully hereinafter.

The full nature of the invention will be understood from the accompanying drawings and the following description and claims:

In the drawings,

Fig. 1 is a diagrammatic view of an automotive fuel supply control system with the invention applied thereto.

Fig. 2 is an interior plan view of the control proper, one half of the housing being removed.

Fig. 3 is a cross-sectional view taken on line 3—3 of Fig. 2 and in the direction of the arrows, parts being shown in elevation.

Fig. 4 is a cross-sectional view taken on line 4—4 of Fig. 2 and in the direction of the arrows.

In Fig. 1 of the drawings, 10 indicates the dash of a vehicle, 11 the front panel, 12 a carburetor or like device controlled by rod 13 suitably operated by accelerator pedal 14 normally constrained to low idle position by spring 15. This comprises the fuel supply control system.

The brake system of the vehicle includes a brake pedal 16 which conventionally controls the vehicle brakes and also controls a switch 17 leading to a stop or warning light 18. Whenever the brakes are applied this stop light is energized.

All of the foregoing is conventional. Mounted upon the panel 11 as by bracket 19, is the control unit 20, same being more fully illustrated in Figs. 2 to 4 inclusive. Said unit may be mounted upon the engine if desired. Mounted on the dash is switch 21 of push button type and of normally open type. Usually and normally this switch 21 is only held closed for a moment.

Circuit wire 22 leads to the switch 21 from the battery B and wire 23 leads from said switch to the said control unit. Cut into the stop light circuit downstream of the stop light switch 17 is line 24. Each line 23 and 24 leads to an electromagnet 25 and 26, respectively, see Fig. 2. Said electromagnets are commonly grounded as at 28, see Fig. 2.

Projecting from the said control unit is a control element 29. Herein same is shown in the form of a flexible cable and the exposed end thereof is suitably secured at 29a to control rod 13 so that it moves in the effective direction of said rod that is, as the throttle rod 13 is advanced or retarded the cable 29 tends to advance or retard therewith unless otherwise constrained. Whenever necessary, required or desired, one or more pulleys may be employed same being suitably mounted as on the engine, the control unit 20, etc. Herein the pulley 30 is carried by a housing 31 having a tubular stem 32 clamped as at 33 to a tubular projection 34 mounted in said control unit.

The cable 29 is pulled out of the unit to its fullest extent and clamped at 29a when rod is in the low idle position. Preferably the cable is slacked off about one eighth of an inch in this operation. When the throttle rod 13 is advanced to higher speeds, it, as shown in Fig. 1, moves to the left. This permits cable 29 to move to the left and into the unit. A rod and linkage obviously can serve just as well as a cable.

The operation of the unit is as follows:

Whenever a set position above low idle is desired for rod 13, the rod is moved to the desired position and manually held therein. Then switch 21 is closed. This energizes solenoid 25 to dispose keeper 52 in the dotted line position. Thus the cable 29 is locked so when the accelerator is released, the rod cannot return to low idle.

When acceleration is desired, due to the one way character of the cable lock, the unit control is removed and not reestablished. When deceleration is desired, or required, application of the brakes effects energization of electromagnet 26 to attract keeper 52 to effect lock release.

As will be more fully apparent from the subsequent detailed description, continued acceleration has no effect on the unit after initially effecting unit release. Continued brake application also has no practical effect on the unit after initially effecting unit release, although electromagnet 26 obviously is energized as long as brakes are applied or energized as often as the brakes are applied.

The major portion of the foregoing description applies almost in toto to the disclosure in the first mentioned application aforesaid.

Reference will now be had more particularly to Figs. 2 to 4. Herein the housing of the control unit comprises a pair of complementary casings 35a and 35b. Each includes certain half cavities and half channels. Same will be referred to collectively. Thus, channel 36 is quite elongated and is threaded at its open end 37 to take member 34. The latter has a bell-mouth as shown.

At the closed end 38 of channel 36 there is anchored as at 39 a light tension spring 40, the other and eye end of which is connected to the bar 41 reciprocable in channel 36. The other end of the bar is connected to the cable 29. Thus the bar is normally constrained to the right at all times by reason of spring 15. However, when the accelerator is depressed, the cable or rod is slacked off or pushed in respectively and retraction is assisted by light spring 40.

Beneath channel 36 and parallel thereto is coil chamber 42. Inwardly directed partitions 43, see Figs. 3 and 4, form a restrictive passage or throat. Inward projections 44 and 45 localize electromagnets 25 and 26 respectively in the coil chamber 42 so that there is a fixed gap between the poles 46a and 47a respectively of the magnet pole pieces 46 and 47 respectively.

The supply lines 23 and 24 respectively to said coils are introduced through an insulation grommet 48 seated in opening 49 leading to the chamber 42.

A channel 50 extends from channel 36 to chamber 42 and at the inward projection 43. It is extended beyond channel 36 as at 51. The left hand wall 50a is transverse to the channel. The right hand wall 50b is inclined or biased thereto.

Between chamber 42 and channel 36 and disposed to the right of channel or cross passage 50 and opening into the wall 50b thereof is the recess 51a. Seated therein is a light spring 52a. This spring at its outer end bears upon the locking plate or keeper 52. This plate pivots on its upper end in the upper end of extension 51 of cross-passage 50.

This plate has an aperture 53 therethrough. When the plate bears against wall 50a member 41 can slide freely through the plate. When plate 52 is moved relative to the bar and disposed adjacent wall 50b the plate locks upoon the bar to hold it in the gripped position incident to spring 15.

The plate is extended at 54 and same constitutes a keeper common to both magnets. Bar 41 prevents the plate dropping out of root 51 of cross passage 50. Note that spring 15 is stronger than either or both of springs 40 and 52a.

In the preferred form of the invention the bar 41 comprises a steel tube and the cable 29 extends therethrough and is anchored to the eye portion of the spring 40. However, the tube and spring cable end are suitably rigidized.

In operation when the accelerator is depressed, the cable is slacked off and spring 52a becomes effective to dispose plate 52 transverse to bar 41. When switch 21 is closed, electromagnet 25 is energized to move the plate 52—54 to approximately the dotted line position, see Fig. 2. The bar is then locked against retrograde movement and the throttle is held locked in that position. It is preferred that in no case does the locking plate engage either wall 50a or 50b below channel 36.

Upon brake application electromagnet 26 is energized. This moves the plate 52—54 approximately to the full line position, see Fig. 2, assisted by spring 52a. This releases the plate-bar lock and spring 15 immediately moves bar 41 toward low idle. The comparable effect is attained when the accelerator is further advanced from the so-called locked position because then the accelerator spring force is removed from the cable and spring 52a can return plate 52—54 to the bar releasing position.

While the invention has been illustrated and described in great detail in the drawings and foregoing description, the same is to be considered as illustrative and not restrictive in character.

The several modifications described herein as well as others which will readily suggest themselves to persons skilled in this art, all are considered to be within the broad scope of the invention, reference being had to the appended claims.

The invention claimed is:

1. In a throttle control system for holding an accelerator of a vehicle in a position above low idle, the accelerator being normally constrained to low idle, the vehicle including a stoplight circuit normally energized when vehicle braking is effected, the combination therewith of a master switch and a control unit, said unit comprising a pair of electromagnets in close proximity to each other, a single armature type keeper juxtapositioned thereto and selectively responsive magnetically to each magnet when energized, a throttle connected member movable to and fro, and a catch member for selectively locking and releasing the to and fro movable member in any desired position above that corresponding to low idle, the catch member being rigid with the keeper, the master switch controlling energization of one electromagnet to effect locking imposition by the catch member, and the other being automatically energized when braking is effected and for effecting catch member release of the to and fro movable member, accelerator advance automatically effecting catch member release of the to and fro movable member.

2. In a throttle control system the combination of a to and fro movable member accelerator connected and normally responsive to accelerator movement, a pair of opposed slightly spaced apart electromagnets, a single armature type magnetic keeper selectively and directly responsive magnetically to each magnet when energized, and a catch member for holding said member and movable by said to and fro movable keeper.

3. A system as defined by claim 2 wherein the catch member and keeper comprises a single element.

4. In a throttle control system the combination of a to and fro movable member accelerator connected and normally responsive to accelerator movement, a pair of opposed slightly spaced apart solenoid magnets, a single keeper selectively responsive to each magnet when energized, and a catch member for holding said to and fro movable member and movable by said keeper, the catch member being disposed crosswise of the to and fro movable member and the latter is disposed through the catch.

5. A system as defined by claim 4 wherein the catch member and keeper comprises a single element.

6. In a control system the combination of a pair of coaxially disposed slightly spaced apart electromagnets, a keeper disposed therebetween and selectively responsive to each electromagnet when energized, a to and fro movable member adapted for connection to a fuel control element and normally responsive thereto, and a pivoted catch member for said to and fro movable member normally constrained to member releasing position, said catch member being tiltable in accordance with keeper movement.

7. A system as defined by claim 6 wherein the catch member and keeper comprise a single element.

8. In a control system the combination of a to and fro movable member, a tiltable catch member disposed crosswise thereof and extending substantially around the same, the catch member when transversely disposed, releasing the to and fro movable member for movement and when tilted locking the last mentioned member against movement, and a pair of electromagnets for selectively tilting the catch member to effect locking and release.

9. A system as defined by claim 8 wherein the catch member includes an extension forming a keeper, the electromagnets being oppositely and coaxially disposed with the keeper disposed therebetween.

10. A system as defined by claim 9 wherein a spring tends to constrain the catch member to release position.

11. A system as defined by claim 10 wherein a second and light spring tends to constrain the to and fro movable member to move same in a direction to effect automatic release from said catch member.

GERALD A. FISHER.

REFERENCES CITED

The following references are of record in the file of this patent:

UNITED STATES PATENTS

| Number | Name | Date |
| --- | --- | --- |
| 2,021,832 | Callihan | Nov. 19, 1935 |
| 2,034,253 | Shelley | Mar. 17, 1936 |
| 2,127,454 | Wolfe | Aug. 16, 1938 |
| 2,159,772 | Schroedter | May 23, 1939 |
| 2,270,002 | Glick | Jan. 13, 1942 |
| 2,318,931 | Diver | May 11, 1943 |
| 2,387,126 | Dillon | Oct. 16, 1945 |
| 2,467,485 | Krieg | Apr. 19, 1949 |